United States Patent [19]
Goers et al.

[11] Patent Number: 5,900,119
[45] Date of Patent: May 4, 1999

[54] METHOD OF FORMING IMPROVED LOOSE FILL PACKING MATERIAL FROM RECYCLED PAPER

[75] Inventors: John Lawrence Goers, Idaho Springs; Thomas S. Warda, Aurora; William H. Oliver, Highlands Ranch, all of Colo.

[73] Assignee: E-Tech Products, Inc., Denver, Colo.

[21] Appl. No.: 08/728,150

[22] Filed: Oct. 9, 1996

[51] Int. Cl.$^6$ .................................................. D21J 7/00
[52] U.S. Cl. .......................... 162/218; 162/220; 162/382; 162/388; 162/383; 264/87
[58] Field of Search ................................... 162/218, 220, 162/382, 383, 384, 385, 386, 387, 388, 389, 390; 425/84, 85; 264/86, 87

[56] References Cited

U.S. PATENT DOCUMENTS

| | | | |
|---|---|---|---|
| 424,003 | 3/1890 | Keyes | 162/220 |
| 1,284,928 | 11/1918 | Raymond . | |
| 1,324,935 | 12/1919 | Sims | 162/220 |
| 1,527,201 | 2/1925 | Louisot . | |
| 1,661,727 | 3/1928 | Koppelman et al. . | |
| 1,701,238 | 2/1929 | Kennedy . | |
| 1,725,429 | 8/1929 | Van Schaack, Jr. . | |
| 1,859,325 | 5/1932 | Ayerst . | |
| 1,899,197 | 2/1933 | Huff et al. . | |
| 1,907,795 | 5/1933 | Hall . | |
| 1,963,134 | 6/1934 | Keiding | 162/220 |
| 2,182,274 | 12/1939 | Baker et al. . | |
| 2,571,334 | 10/1951 | Browne . | |
| 2,649,958 | 8/1953 | Rausch . | |
| 2,663,230 | 12/1953 | Wagner . | |
| 2,703,041 | 3/1955 | Comstock . | |
| 2,777,367 | 1/1957 | Ednell . | |
| 2,834,466 | 5/1958 | Hament . | |
| 2,841,054 | 7/1958 | Muller et al. . | |
| 2,955,975 | 10/1960 | Richardson . | |
| 3,074,543 | 1/1963 | Stanley . | |
| 3,185,370 | 5/1965 | Reifers et al. . | |
| 3,233,659 | 2/1966 | Nettel et al. . | |
| 3,250,668 | 5/1966 | Modersohn | 162/220 |
| 3,306,813 | 2/1967 | Reifers . | |
| 3,320,120 | 5/1967 | Randall . | |
| 3,384,221 | 5/1968 | Houtman . | |
| 3,430,934 | 3/1969 | Weishaupt . | |
| 3,481,455 | 12/1969 | Graham et al. . | |

(List continued on next page.)

FOREIGN PATENT DOCUMENTS

| | | | |
|---|---|---|---|
| 891791 | 10/1953 | Germany . | |
| 47-7726 | 3/1972 | Japan | 162/388 |
| 9117932 | 11/1991 | WIPO . | |

OTHER PUBLICATIONS

Graham, Arthur. "Use and Testing of Free–Flowing Cushioning," Modern Packaging Magazine, Jul. 1971.
Emery International Developments, Ltd.—Pulp Molding Equipment Brochure.
Article entitled "Environmentalism's Cost: Peanuts," Valley News newspaper, White River Juntion, Vermont, Apr. 13, 1989.

Primary Examiner—Stanley S. Silverman
Assistant Examiner—José A. Fortuna
Attorney, Agent, or Firm—Dorsey & Whitney LLP

[57] ABSTRACT

The present invention comprises a method for forming a biodegradable, thin-walled packing chip from an aqueous pulp of recycled newsprint by contacting the pulp with a mold comprising: (a) a solid core having substantially the shape of the article to be formed and having a minimal number of holes through which air may be evacuated and (b) an air permeable, stretchable fabric which covers the exterior of the core. After forming the chip on the fabric through application of a vacuum, the fabric is separated sufficiently from the solid surface to cause release of the chip from the fabric. The dried packing chip has enhanced packing qualities, is environmentally friendly and provides a significant new use for recycled newsprint.

19 Claims, 5 Drawing Sheets

U.S. PATENT DOCUMENTS

| | | |
|---|---|---|
| 3,606,726 | 9/1971 | Spertus et al. . |
| 3,613,522 | 10/1971 | Johnson . |
| 3,650,877 | 3/1972 | Johnson . |
| 3,661,707 | 5/1972 | Emery et al. . |
| 3,719,553 | 3/1973 | Dorril et al. ............................ 162/227 |
| 3,723,240 | 3/1973 | Skochdopole et al. . |
| 3,855,053 | 12/1974 | Fuss . |
| 3,896,934 | 7/1975 | Graham et al. . |
| 3,929,564 | 12/1975 | Reifers . |
| 3,933,959 | 1/1976 | Skochdopole et al. . |
| 4,104,440 | 8/1978 | Collins . |
| 4,109,040 | 8/1978 | Ottaviano . |
| 4,166,875 | 9/1979 | Bussey, Jr. . |
| 4,169,179 | 9/1979 | Bussey, Jr. . |
| 4,215,166 | 7/1980 | Bussey, Jr. . |
| 4,514,453 | 4/1985 | Bussey, Jr. . |
| 4,599,269 | 7/1986 | Kohaut et al. . |
| 4,606,965 | 8/1986 | Bussey . |
| 4,619,862 | 10/1986 | Sokolowski et al. . |
| 4,621,022 | 11/1986 | Kohaut et al. . |
| 4,680,219 | 7/1987 | Vernois et al. . |
| 4,683,028 | 7/1987 | Waller et al. . |
| 4,806,410 | 2/1989 | Armington et al. . |
| 4,839,210 | 6/1989 | Komaransky et al. . |
| 4,937,131 | 6/1990 | Baldacci et al. . |
| 4,994,148 | 2/1991 | Shetka . |
| 4,997,091 | 3/1991 | McCrea . |
| 5,151,312 | 9/1992 | Boeri . |
| 5,230,943 | 7/1993 | Pregont . |
| 5,372,877 | 12/1994 | Kannankeril . |
| 5,382,325 | 1/1995 | Warda et al. . |

METHOD OF FORMING IMPROVED LOOSE FILL PACKING MATERIAL FROM RECYCLED PAPER

BACKGROUND OF THE INVENTION

The present invention relates generally to loose fill packing materials or "dunnage," as they are sometimes referred to, such as packing "chips" or "peanuts," and to molds and methods for forming them.

As suggested by their name "loose fill" packing materials are used to surround an article being shipped within a container or package to prevent movement of the article within the container and to prevent contact between the article's surface and the interior surfaces of the container. Simply stated, loose fill packing material is intended to cushion the article or articles being shipped from the forces which may be exerted on the exterior of the container during shipment. The present invention provides a method for preparing an improved loose fill packing material.

The suitability of any loose fill material is judged by certain functional characteristics. Among other things, loose fill packing material should be strong and have structural integrity, while providing the necessary cushioning properties. It should be light weight and should not nest or settle. The total volume of the loose fill packing should not diminish during shipment and/or storage of the article and container, notwithstanding vibration, shaking or other movements imparted to the container. The loose fill packaging material should be relatively free-flowing and static-free, qualities that enhance the ability to dispense it into the container and around the article during packing. Obviously, any loose fill packing materials should be as inexpensive as possible.

In recent years, expanded plastic foam, primarily polystyrene, has been frequently utilized as loose fill packing material. Although formed into a variety of shapes including, for example, hollow cups, saucers and S-shapes, they are frequently referred to as "peanuts." These plastic peanuts exhibit certain desirable cushioning properties. On the other hand, they also have certain highly undesirable qualities. Principal among these is the fact that plastic peanuts are not easily recyclable or biodegradable and, therefore, are environmentally unfriendly. Whether they come to rest in a neighbor's lawn or in a public landfill, they do not deteriorate. They litter the landscape and take up unnecessary landfill space. Unless reused as packing material, plastic peanuts from an unpacked container are virtually useless. Frequently, plastic peanuts exhibit static build-up, making them annoying to work with. Children and pets may ingest plastic peanuts, causing choking, suffocation, illness or death.

The negative qualities of plastic peanuts have provided incentives to prepare dunnage from natural, environmentally friendly materials. For example, efforts have been expended to make loose fill packing from organic material, such as wood fibers bound together with starch or other adhesives and formed into the appropriate shape. This type of dunnage is relatively expensive to make; the manufacturers have charged a premium in excess of the price of plastic peanuts. These materials have a number of other defects, including the fact that products containing significant amounts of starch may attract rodents or pests.

Attempts have also been made to manufacture loose fill packing from recycled paper, particularly recycled newspaper. Examples are described in U.S. Pat. No. 4,997,091 to McCreu, 5,151,312 to Boeri, 5,230,943 to Pregont, 5,372, 877 to Kannankeril, and 5,382,325 to Warda et al. The latter patent is assigned to the same assignee as the present invention. These materials are manufactured by molding the individual pieces of loose fill packing material from a pulp of recycled paper and water.

Figure 1:
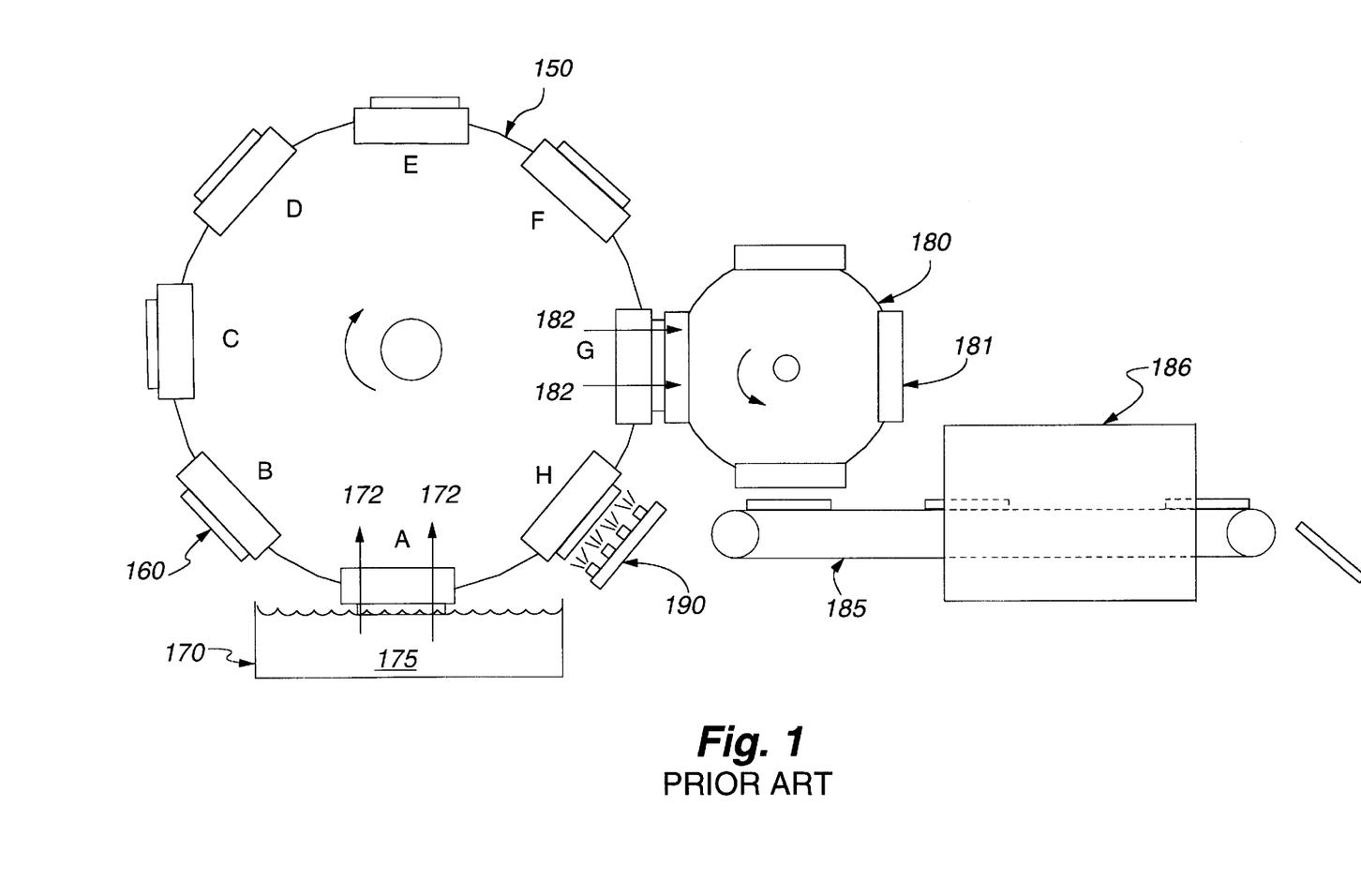
FIG. 1 is a schematic elevation view showing the arrangement of equipment typically used in prior art processes for molding articles from aqueous paper pulp, such as the process used in molding egg cartons.
Figure 2:
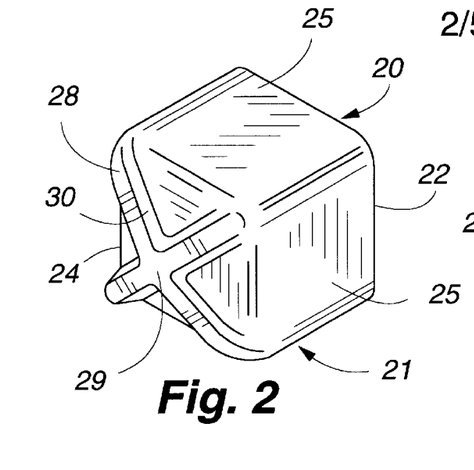
FIG. 2 is a front perspective view of a packing chip embodying the present invention.
Figure 3:
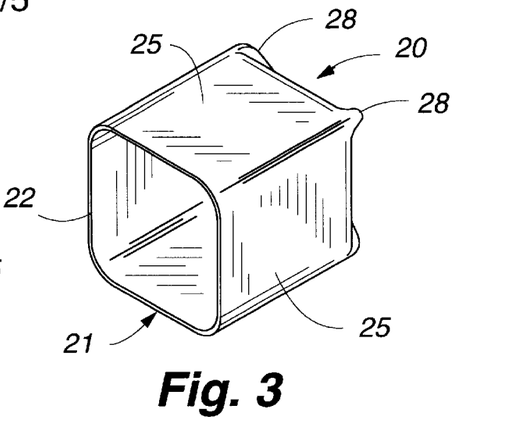
FIG. 3 is a rear perspective view thereof.
Figure 4:
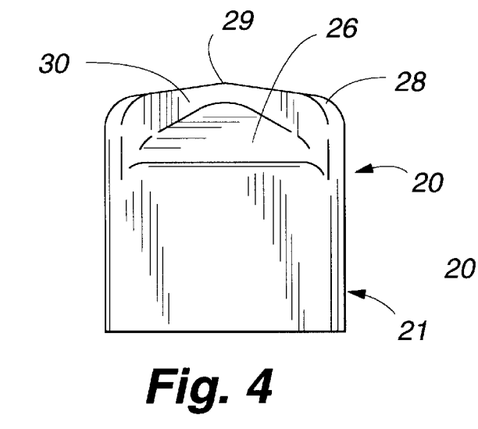
FIG. 4 is a side elevation view thereof, the other side elevations being identical therewith.
Figure 5:
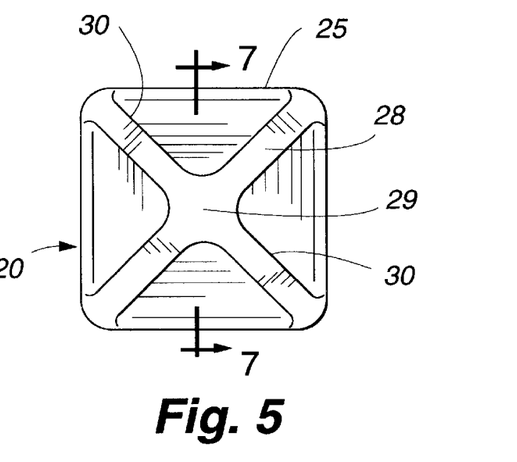
FIG. 5 is a top plan view thereof.
Figure 6:
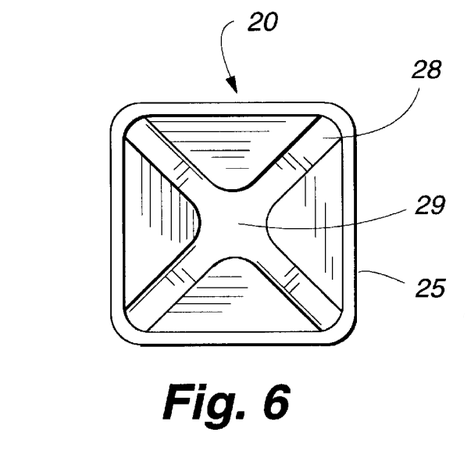
FIG. 6 is a bottom plan view thereof.
Figure 7:
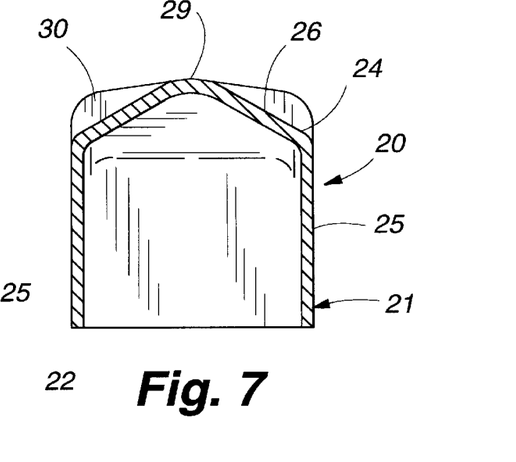
FIG. 7 is a section view taken substantially in the plane of line 7—7 on FIG. 5.
Figure 8:
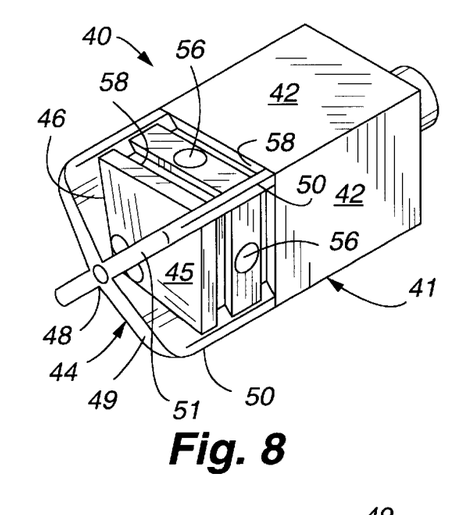
FIG. 8 is a front perspective view of a mold embodying the present invention.
Figure 9:
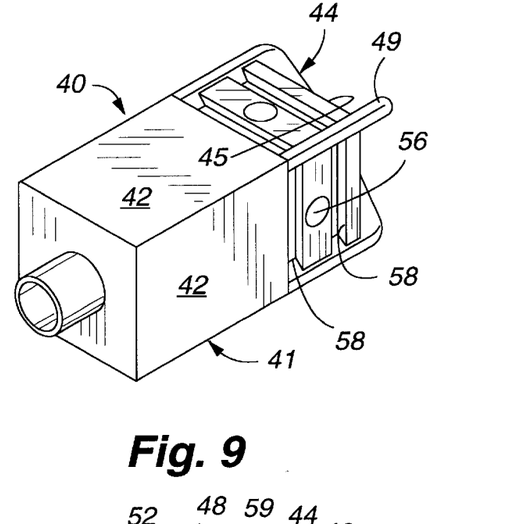
FIG. 9 is a rear perspective view thereof.

Generally, the molding of paper "pulp" into products, such as egg cartons, has utilized processes like the rotary vacuum forming machine illustrated schematically in FIG. 1.

As illustrated in FIG. 1, cylinder 150 contains molds, such as 160, extending outward from the periphery of the cylinder. Typically, each mold is made from a "screen," i.e., metal mesh, having the shape of the interior of the finished molded article. The cylinder 150 rotates in a clockwise direction as the molds proceed continuously through various stages in the process. These stages are illustrated at positions A through H in FIG. 1. FIG. 1 is not drawn to scale and is for the purposes of comparison only.

At position A, the mold 160 is dipped into the aqueous cellulose pulp 175 in pulp tray 170. Simultaneously, a vacuum is applied toward the inside of the mold in the directions shown by arrows 172 (using equipment not illustrated) to pull the pulp in the pulp tray against the mold screen. As water is pulled through the screen, the cellulose paper pulp is caught on the screen to form the molded article. Water, however, does pass through the screen. The vacuum continues to be applied until a molded article of the appropriate thickness has been formed in the interstices of the mold 160.

As the cylinder revolves further, the screen containing the crude article of molded pulp is rotated out of the pulp tray 170. Additional water is removed by inverting the mold at position E. At position G, it is brought adjacent to a press and transfer drum 180. The drum contains molds 181 which mate with mold 160 and conform with the exterior shape of the molded article. By movement of the drum 180 in a counter-clockwise direction, the mating mold is brought into position (not shown) where it contacts the partially molded pulp thereby pressing the pulp against the screen 160 to form the pulp into the shape of the final article and forcing out excess water. Removal of the excess water is important to minimize the energy requirements of drying, which may constitute one of the most significant costs in producing the molded product. Upon completion of the molding, the press and transfer drum is rotated in a counter-clockwise direction to separate the two molds. As this rotation is commenced, a positive blast of air (sometimes called "blow-off") is directed through the screen 160 (via equipment now shown) in the direction of arrows 182 to separate the pulp from the mold 160. The vacuum then holds the resulting molded article loosely in the mating mold 181 until the press and transfer drum 180 reaches a position where the molded article is released down to conveyor 185. The molded article and others like it are then passed via the conveyor through a dryer 186 for a sufficient period of time to remove the remaining water and produce the finished product.

The cylinder 150 continues to rotate the mold 160 through position H. In position H the mold is brought adjacent to spray-off station 190, where it is contacted with water to clean it in preparation for the next molding step at position A.

Although this process is used commercially, it is far from perfect in a number of respects. Among other things, it is impossible to continuously and reliably prepare multiple, small thin-walled articles, such as loose fill packing material, with this equipment. This is unfortunate, since cellulose packing material is preferably made with the thinnest possible walls. This generally improves its qualities as a packing material. More importantly, thin-walled, cellulose packing material biodegrades completely in a shorter period of time.

The inability of prior art processes to produce thin-walled cellulose packing material is caused, in part, by the fact that the intermediate pulp article prepared on the screen usually contains excess moisture. Excess moisture reduces the structural stability of the formed pulp article, making it impossible to produce a thin-walled article with enough structural integrity to be successfully removed from the screen via conventional blow-off techniques. Moreover, the pressing of molds 160 and 181 (at position G illustrated in FIG. 1) forces the molded article into the interstices of the screen 160. When that article is thin-walled, the subsequent blow-off step is difficult to successfully perform without breaking, tearing or cracking the article. While it might be possible to eliminate the pressing step at station G, separation of a thin-walled molded article from the screen is still difficult. This is further complicated by the height at which such a separation would occur, resulting in destruction or mutilation of the wet pulp article when it lands on the conveyor. Where multiple articles are being molded simultaneously, removal is further complicated by the fact that positive blow-off pressure is lost as soon as one of the articles is removed from the screen.

It is particularly difficult to continuously and reliably prepare a thin-walled article from recycled newsprint and other recycled papers. Generally, newsprint has relatively short fibers which significantly reduces the strength of the wet molded articles during the intermediate processing steps.

It has now been discovered that thin-walled packing chips of paper pulp can be prepared reliably and efficiently utilizing the process of the present invention. As used herein, the term "chip" is intended to mean an individual unit of loose fill packing material or dunnage. Unless otherwise indicated, the use of this term is not intended to imply that the chip has any particular shape. Thin-walled packing chips have improved biodegradability. Surprisingly, the thin-walled packing chips of the present invention also have improved characteristics important to their performance as loose fill packing material.

OBJECTS OF THE INVENTION

It is an object of the invention to provide an efficient and effective method for molding articles (in particular, thin-walled, loose fill packing chips) from paper pulp.

It is a further object of the invention to provide an improved mold for forming articles (in particular, thin-walled, loose fill packing chips) from paper pulp.

Last, but not least, the invention provides an improved packing chip, i.e., a thin-walled chip prepared from paper pulp, having both improved biodegradability and improved qualities as loose fill packing material.

These and other objects and advantages of the present invention can be achieved utilizing the processes, apparatus and articles described herein.

SUMMARY OF THE INVENTION

We have now invented an efficient and effective method for forming a biodegradable, thin-walled article from paper pulp. This is achieved using an improved mold as described herein. The thin-walled packing chip produced by the process and mold of the present invention has improved biodegradability and has improved qualities as loose fill packing material.

In particular, the present invention is embodied in a mold comprising: (a) a core having substantially solid surfaces forming substantially the shape of the article to be formed and having a minimal number of holes through which air may be evacuated or forced and (b) a flexible fabric material which covers the exterior of the core.

As used herein, the term "substantially the shape of the article to be formed" means that the core of the mold has a surface the general shape of which corresponds to either the interior or exterior shape of the molded article. Because the fabric material overlies the solid surface and the molded article is formed on the fabric, the molded article will not have the precise, identical shape as the solid surface of the mold, but one (i.e., inner or outer) surface of the molded article and the surface of the core will be substantially the same shape.

As used herein, the term "a minimum number of holes" refers to one or more holes on the solid surface of the core adequate to cause application of a partial vacuum across the fabric to form a molded article of relatively uniform thickness on the fabric, but not so numerous as to allow a significant amount of residual water to accumulate on the side of the fabric opposite the one on which the molded pulp article is formed.

The use of a mold with a solid core having substantially the shape of the article to be formed and having a minimal number of holes for air movement reduces the amount of water that is retained in the interior of the mold. Indeed, with the molds of the present invention, there is little, if any, space for water to be retained on the side of the fabric opposite the one on which the cellulose article is formed. This reduces the amount of water in the pulp article formed on the mold, thereby improving its structural integrity and reducing the amount of water that must be subsequently removed from the pulp by drying.

In addition, the use of a flexible fabric material on the exterior of the mold assists in making it possible to form a thin-walled article that can be successfully removed from the mold without air blow-off which causes breaking, tearing, or cracking of the molded article. The problem of attempting to form a thin-walled article from paper pulp has been previously addressed in a totally different manner. U.S. Pat. No. 2,841,054 to Muller et al. attempts to solve the problem by a dual step molding process. Initially, a thick-walled article is prepared on a conventional wire screen. The article is then removed from that mold and processed in a second, i.e., "expression," mold which presses the formed article between male and female mold members thereby reducing the wall thickness of the article and squeezing out excess water. This is substantially the same process as shown in FIG. 1. Obviously, such a dual step molding process requires more equipment and is impractical for the mass production of large quantities of small irregularly shaped articles such as packing chips. Indeed, the Muller, et al. patent does not mention the use of the process for forming loose fill packing material.

The use of fabric over a conventional metal mesh screen has been previously suggested in German Patentschrift Number 891,791 to Marguerat as a method of molding paper pulp. The molding process shown therein, however, is still predicated on the use of a wire screen mold with a hollow interior. This results in the accumulation of water in the mold making it impossible to reliably produce small thin-walled articles from molded paper pulp. There is no recognition that the process of this German patent could be used to produce such an article, particularly a thin-walled loose fill packing material. Further, the process is not suitable for commercial applications, since repeated contacting and movement of the fabric and wire screen would result in rapid failure of the fabric.

DETAILED DESCRIPTION OF THE INVENTION AND THE PREFERRED EMBODIMENT

We have now discovered an efficient and effective method for forming a biodegradable, thin-walled packing chip from a pulp of cellulose material. The present invention is embodied in an improved packing chip and a mold apparatus and method for making the same. The packing chip is a thin-walled packing chip produced in a unique configuration from a pulp of cellulose material.

In this process, the pulp is contacted with a mold comprising a core having substantially solid surfaces forming substantially the shape of the packing chip to be formed and having a minimal number of holes through which air may be evacuated or forced and a flexible fabric material covering the exterior of the solid surface of the mold. A partial vacuum is applied to cause the cellulose to be deposited from the pulp in a thin layer in the shape of the packing chip on the fabric. After an appropriate period of time, the mold is removed from the pulp and the vacuum is terminated. The fabric and core are then moved away from each other sufficiently to cause the thin layer of cellulose pulp in the shape of a packing chip to separate from the mold. The molded pulp article is then dried to form the finished product. The fabric is then sprayed with high pressure water to remove any remaining fibers from the fabric before the next molding cycle.

The process of the present invention can be used with any aqueous cellulose pulp known to those skilled in the art. In the preferred form of the invention, recycled paper is used to form the pulp. Because the invention forms an ideal use for the beneficial recycling of newsprint which is widely available and inexpensive, that material is the preferred starting material. However, any of the other, numerous forms of recycled paper could be used either alone or in combination. Since recycled newsprint is comprised of relatively short cellulose fibers, a preferred embodiment of the present invention utilizes a smaller amount of "office white" or "corrugated" recycled paper to provide longer fibers that facilitate the molding process. One illustrative composition comprises 85% newsprint fibers and 15% office white fibers. Other starting materials or mixtures of starting materials supplying the necessary cellulose material can be used.

The cellulose pulp can be prepared utilizing any of the techniques familiar to those skilled in the art. In a preferred embodiment of the invention, we have found it desirable to add a surfactant to improve wetting of the paper. We have also found it desirable to add a flocculent which produces cationic charges that encourage the smaller newsprint fibers to cling to the larger ones, thereby improving the dispersement of pulp in the water. Finally, it may also be desirable to add starch to help bind the fibers for purposes of molding, to reduce dust which might otherwise occur in handling the thin-walled molded articles, and to increase their strength. The use of starch or any other additives, however, is not required to produce thin-walled molded articles in accordance with the process of the present invention.

A. Improved Thin-Walled Packing Chip:

By means of the present invention, it is possible to prepare thin-walled molded articles of paper pulp. For, example, packing chips can be prepared having local wall thicknesses of up to $\frac{1}{32}$" and an average or median wall thickness less than that amount.

An individual loose fill packing chip embodying the present invention is illustrated in FIGS. 2–7. The chip is formed using the mold depicted in FIGS. 8–17 as described herein. The chip 20 comprises an elongated central body 21 of square cross-section and defining an open end 22 and a closed end 24. The body is formed by four side planes 25 defining a square open end 22. The closed end 24 is of a polyhedron or pyramid shape comprising four intersecting sloped side planes 26 which intersect along intersection 28 and which converge at a closed apex 29. Ridges or buttresses 30 are formed at the intersection 28 of adjoining planes 25. These buttresses perform two important functions and have demonstrated unexpectedly improved results. First, they strengthen the chip and add structural integrity that prevents crushing. Second, they prevent the polygonal shaped end 24 of the chip from entering the open end 22 of another chip, thereby impeding the nesting of the chips within one another. Both functions significantly improve the performance of the chip 20 as a packing material.

The thin-walled products of the present invention are especially appropriate as loose fill packing material. Because they are thin-walled, they biodegrade more rapidly than other loose fill packing material prepared from cellulose pulp. Surprisingly, the fact that they are thin-walled does not detract from their properties as loose fill packing material. As shown in the following example, thin-walled loose fill packing material of the present invention meets all of the requirements of Federal Specification PPP-C-1683A, in contrast to the typical polystyrene packing peanuts.

EXAMPLE

Loose fill packing chips were prepared as described above from an aqueous pulp comprising approximately 85 percent newsprint and about 15 percent "office white." The chips were prepared in the shape of 1 inch cubes and had a density of about 1.1 pounds/cubic foot or approximately 870 chips per cubic foot.

The packing chips meet the standards of Federal Specification PPP-C-1683A entitled "Cushioning Materials, Expanded Polystyrene Loose-Fill Bulk," which sets standards for the following characteristics.

"Vibrational Settling" measures the ability of the material tested to support a packaged item and prevent its shifting inside the container due to vibrations encountered during shipping. A low percentage of displacement equates to a high degree of protection, since items are less likely to migrate toward the walls and sides of the container, where damage could occur.

"Loaded Bulk Density" measures the density of the product under a standardized load.

"Compressive Creep" measures the tendency of the material tested to compress under weight over time. The higher the percentage of compressive creep, the less cushioning ability the material has.

"Compressive Set" measures the ability of the material tested to regain its original volume following a period of compression. The higher the percentage of compressive set, the less ability the material has to spring back into shape to fill voids and cushion items.

"Electrostatic Adhesion" measures the tendency of the material tested to experience static build-up in system lines, dispensing equipment and bags.

"Flowability" measures the ability of the material tested to flow through the nozzle of a delivery hopper into a container. The faster the rate of flow, the more quickly containers can be filled.

The loose-fill packing chips prepared as described were tested in accordance with the Federal Standards. The results are shown in Table I.

TABLE I

| Test: | Result | Pass/Fail |
|---|---|---|
| Vibrational Settling | | |
| (maximum displacement of not more than 30%) | 13% | P |
| Loaded Bulk Density | | |
| (% of compression under weighted load) | 1.11% | — |
| Compressive | | |

TABLE I-continued

| Test: | Result | Pass/Fail |
|---|---|---|
| Creep | | |
| (max 10% w/ 0.4 psi. load) | 5% | P |
| (max 15% w/ 0.8 psi. load) | 9% | P |
| (max 18% w/ 1.2 psi. load) | 6% | P |
| Compressive Set | | |
| (max 5% w/ 0.4 psi. load) | 3% | P |
| (max 10% w/ 0.8 psi. load) | 6% | P |
| (max 13% w/ 1.2 psi. load) | 2% | P |
| Electrostatic Adhesion | | |
| (Shall be non-static) | — | P |
| Flowability | | |
| (at least 6.0 cubic ft./min.) | — | P |

B. Improved Mold and Molding Process:

The parts of a mold 40 embodying the principles of the present invention are illustrated in FIGS. 8–14. The process of utilizing the mold to prepare packing chips 20 is illustrated in FIGS. 14–17.

The mold 40 comprises a core 41. In the particular case depicted, the core has a rectangular body which is square in cross-section and has substantially solid external sidewall surfaces 42 having a shape and configuration corresponding generally to the inside shape of the packing chip 20 to be formed. At one end 44 the core 41 defines inwardly sloping surfaces or planes 45 meeting at intersection lines 46 which in turn intersect at and define an apex 48. The mold further defines external wedge shaped ribs 49 projecting from and extending along the intersection lines 46. The outer edges 50 of the ribs 49 define planes corresponding to and extending from the planes of the core wall surfaces 42. The ends 51 of the ribs extend outwardly from the apex 48 and define tapered or sloping end planes 52, having a slope generally less than that of the planes of the sloping end surfaces 45. Thus, the core of the mold 40 defines and corresponds substantially in shape to the internal shape of the packing chip 20.

The mold 40 is mounted to a top plate 54 of a mold frame (not shown). The core 41 can be made of metal, e.g. aluminum, or plastic or any other material which is durable and can be easily fashioned into smooth surfaces.

In addition to the core 41, the mold 40 comprises a flexible fabric 60 which cooperates with the core in the preparation and removal of a molded article as described herein. Because the fabric contacts the mold core, the surfaces of the core should be smooth to prevent undue wear on the fabric. The fabric 60 can be made of any natural or synthetic cloth or textile material meeting certain basic requirements.

First, the fabric must be permeable to water, but not to the fibers in the pulp. Thus, application of the vacuum causes water to be drawn from the pulp through the fabric, leaving a deposit of pulp on the outer side. The fabric 60 should also be permeable laterally to air. This quality ensures that as a vacuum is applied through the holes in the core, it is distributed laterally in all directions, rather than just through the fabric to the other side adjacent each of the holes. This assures that pulp is deposited uniformly on the other side of the fabric. If the fabric does not have this quality, pulp selectively forms adjacent the holes.

Second, the fabric should be stretchable multi-directionally, i.e., in both axes. Preferably, it should have a stretch ratio of at least approximately 3:1 between the extended and the relaxed state. This allows the fabric to be stretched to cover the mold and to move to a relaxed or contracted position to aid in releasing the wet molded article from the fabric.

Third, the fabric should be relatively thin, since thicker fabrics tend to clog, causing problems in both forming and removing a molded pulp article.

Finally, the fabric should meet pragmatic considerations, such as being relatively inexpensive, durable and easy to work with.

Few materials meet all of the foregoing requirements. The preferred material is the synthetic material known as ('Lycra®' brand spandex blends of nylon elastic polyamides and spandex. Lycra® is a registered trademark of DuPont located in New York, N.Y.). Of the materials designated as Lycra, Lycra D2600-17 available from Darlington Mills, appears to be far superior to the others which we have tried. This material is a blend of 67 percent nylon and 33 percent Lycra with a weight of 3.3 ounces per square yard. One of the unexpected advantages of this particular material is that it effectively distributes air laterally in all directions thereby causing a uniform layer of pulp to be deposited on the fabric.

The mold core also contains an air channel which communicates with a vacuum source (not depicted) for applying a partial vacuum during formation of the cellulose pulp article. In use, the shaped end of the mold 40 including the core 41 and the fabric covering 60 is dipped into an aqueous, cellulose fiber slurry. By applying suction through passages in the mold, a chip 20 is formed on the external mold surface. To this end, the mold body 41 defines at its operative end an internal chamber 55 into which opens a central passage 56 extending axially through the body 41, from an external tubular sleeve 58 extending axially from the end 59 of the body opposite the apex 18. The sleeve 58 is in turn connected to the vacuum source for applying suction to the interior mold chamber 55.

Figure 10:
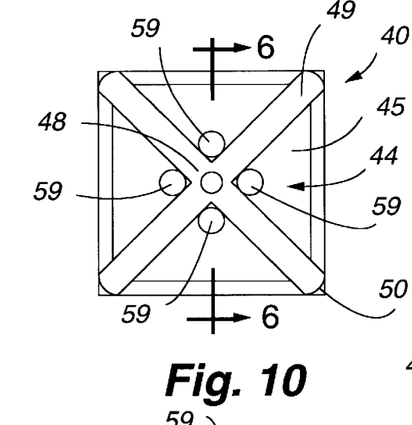
FIG. 10 is a top plan view thereof, the other sides being identical thereto.
Figure 11:
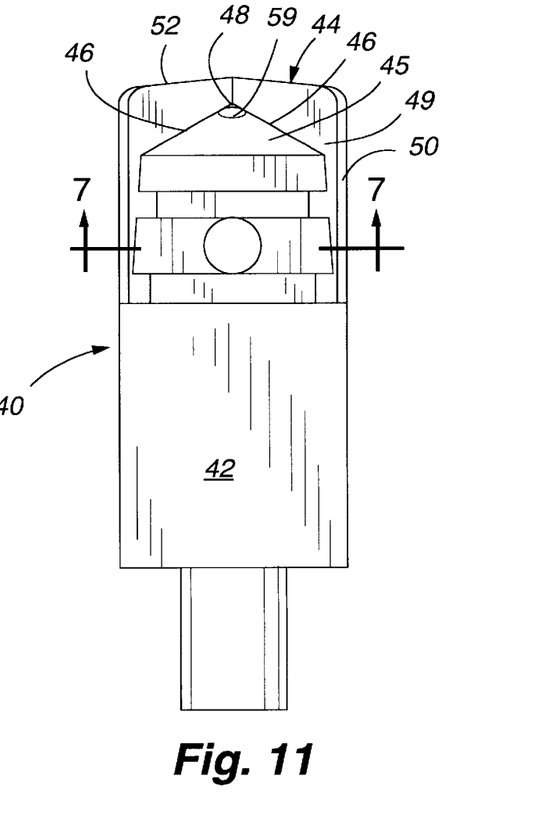
FIG. 11 is a side elevation view thereof.
Figure 12:
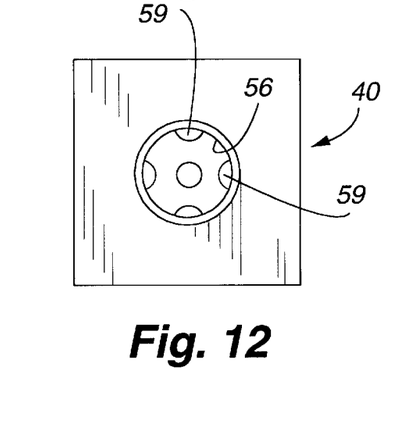
FIG. 12 is a bottom plan view thereof.
Figures 13, 14, 15:
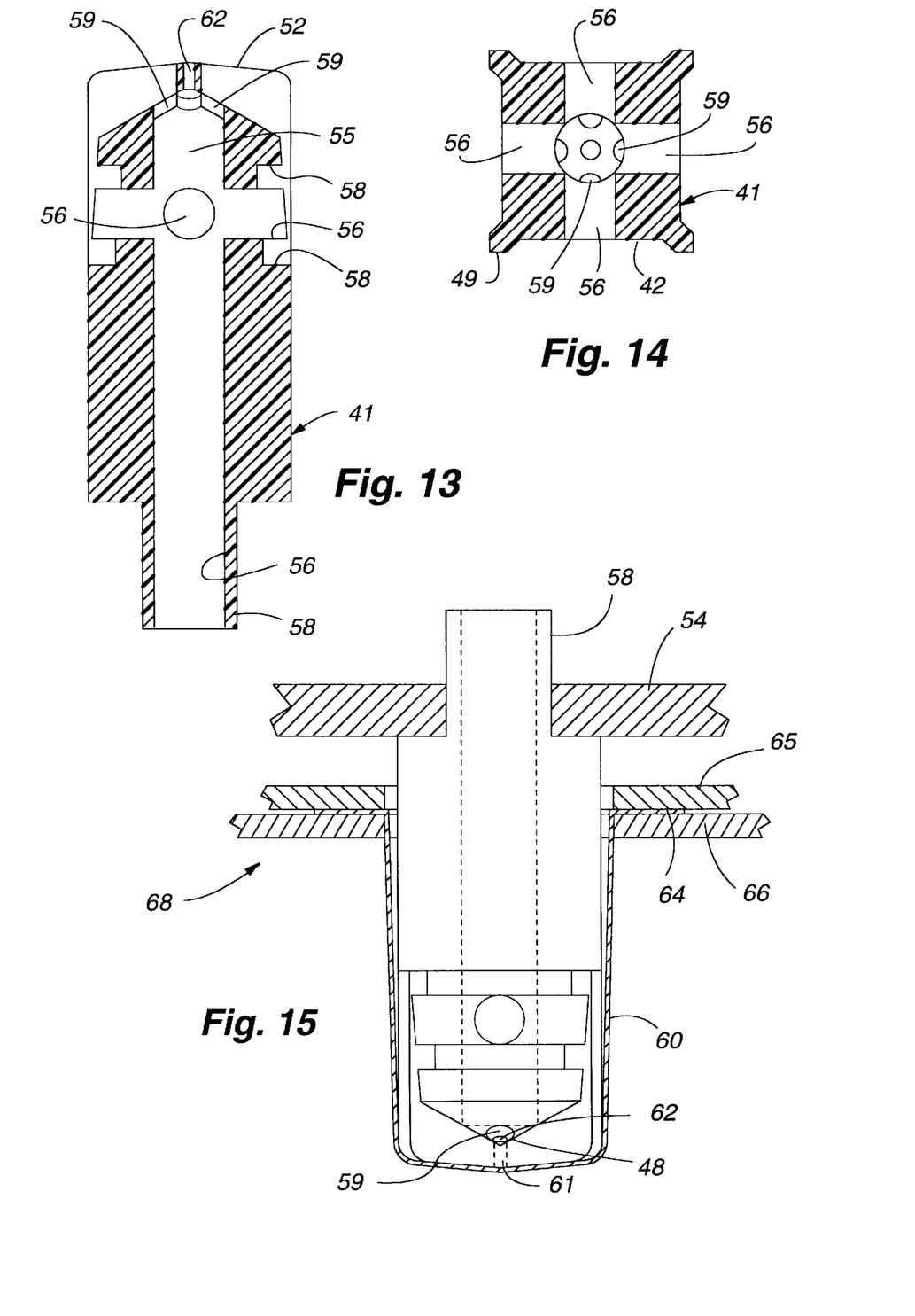
FIG. 13 is a section view taken substantially in the plane of line 13—13 on FIG. 10.
FIG. 14 is a section view taken substantially in the plane of line 14—14 on FIG. 11.
FIG. 15 is a front view of a complete mold of the present invention showing the configuration of the mold parts as supported by a mold frame.

The suction from the mold chamber 55 is applied to the external area of the mold surfaces through transversely extending passages 56 opening into the external sidewall surfaces 42 of the mold core 41, and into parallel transverse channels 58 recessed in the mold sidewall surfaces 42 adjacent the opening of the passages 56. Suction is also applied to the external surfaces of the apex end of the mold through apex passages 59 extending from the chamber 55 and opening into the recessed area defined between the projecting ribs 49 and the sloping end surfaces 45, as shown in FIG. 10.

Figures 16, 17:
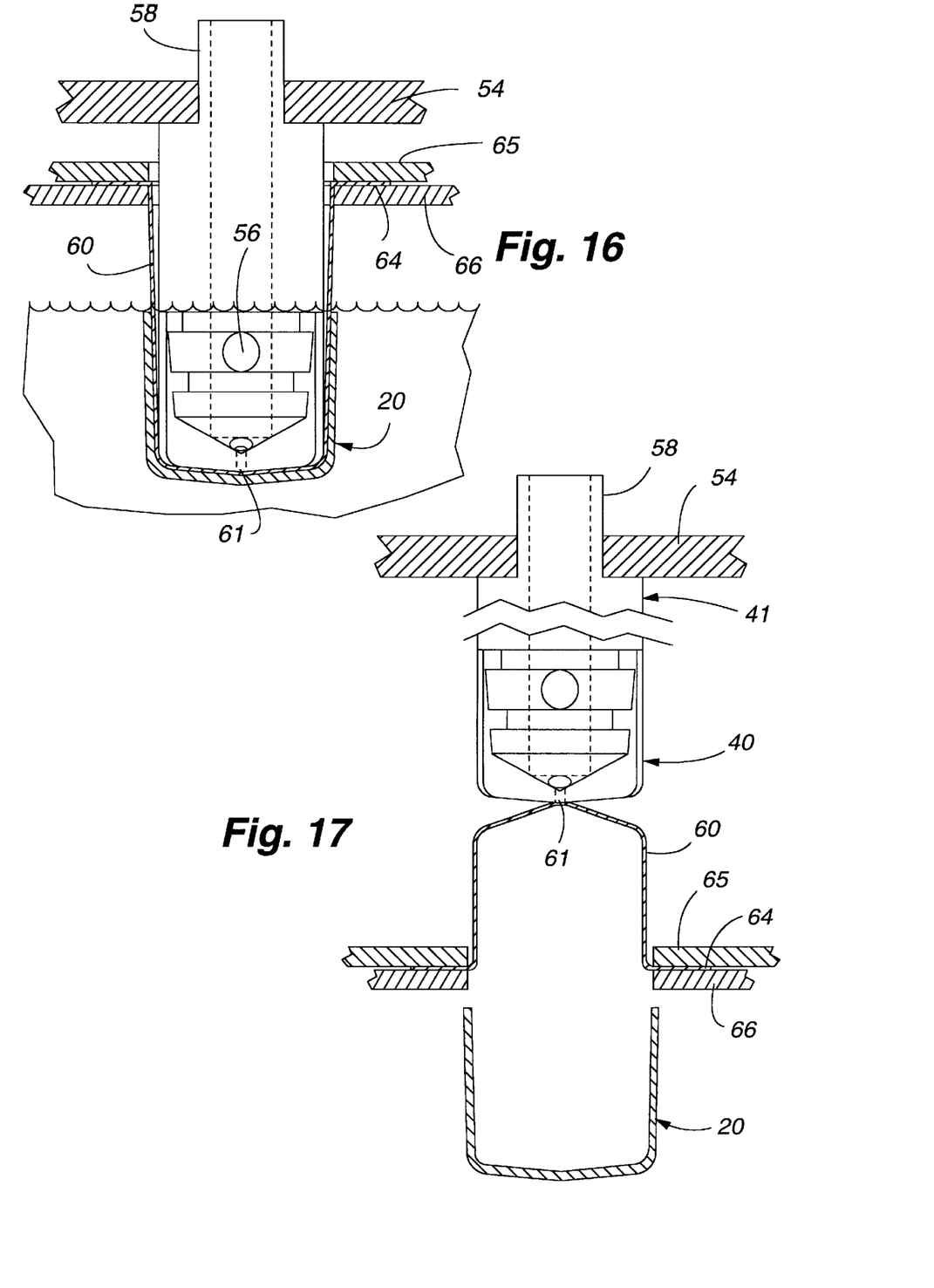
FIG. 16 is a front view of the mold and frame shown in FIG. 15 illustrating the formation of a thin layer of cellulose pulp thereon.
FIG. 17 is a front view of a mold embodying the present invention showing the mold parts in their respective positions in which a molded pulp article is removed from the mold.

The mold also comprises a flexible fabric material 60 which overlays the surface of the core 41 when the mold is in the position for forming the packing chip as depicted in FIG. 16. The fabric sleeve 60 is attached at one end to the core 41 by a pin or bead 61 which is inserted forcefully and securely into an indentation or hole 62 at the apex of the core 41. The bead 61 is made of a deformable material such that it is deformed upon contact with the core, thereby forming a secure attachment when forced into the apex hole 62. Alternatively, the bead can be made of hardened metal and the core of a softer material such as plastic.

At its other end, the edge portion 64 of the fabric sleeve 60 is fixed between stripper plates 65,66, which form a lower mounting plate assembly 68 of the mold frame. In the embodiment depicted in the drawings, the upper or top mounting plate 54 is fixed in the assembly 68. The stripper plates 65,66 move relative to the static top plate 54. When the stripper plates 65,66 are raised, the fabric sleeve 60 is stretched over the surfaces of the core 41, and cover the core so it can be dipped into the cellulose pulp slurry and a suction applied to form a chip over the mold 40 and fabric 60. After forming a chip on the end of the mold 40, the stripper plates are lowered to separate the fabric 60 from the core surface and effect removal of the molded pulp article 20. Alternatively, the upper mounting plate 54 can be movable and the stripper plates 65,66 can be fixed.

When the mold is in the position shown in FIG. 16, it can be brought in contact with the cellulose pulp. A partial vacuum is then applied throughout the channel and the orifices in the solid surfaces of the core as previously described. This forces pulp to be drawn against the fabric leaving a thin deposit of cellulose fibers 25 on the fabric surface as shown in the figure. When the proper amount of cellulose has been deposited on the mold, the mold is removed from the pulp. The fabric is then separated from the core sufficiently to cause the molded article to be released from the mold as shown in FIG. 17.

As previously described the pulp molding processes of the prior art typically used molds of wire mesh. As a partial vacuum was applied to the entire mold, cellulose pulp would be deposited on the surface of the mold. Surprisingly, it has now been found that it is not necessary, indeed it is not desirable, to utilize a mold with a series of holes distributed uniformly throughout its surface. It has now been found that molded pulp articles having an essentially uniform thickness can be prepared with molds of the present invention, such as that depicted in FIGS. 8–14. The mold core has a minimum number of apertures for application of the vacuum. The Lycra fabric overlaying the core acts to distribute the vacuum uniformly over the surface area of the mold, thereby serving the purpose of the interstices in the metal screen molds of the prior art, i.e., distributing the vacuum uniformly along the surface of the mold. The molds of the present invention, however, do not have the deficiencies of the molds in the prior art.

The pulp forming molds of the present invention have a core having a substantially solid surface and a fabric covering. The core has two important properties. First it has a "substantially solid surface," meaning that the core is three-dimensional and, unlike a wire mesh, has a surface that is substantially continuous. The core itself, may be hollow, and, indeed, in the embodiment shown herein has one or more channels for communicating the partial vacuum to the surface of the mold. However, the surfaces of the core themselves are substantially unbroken.

Second, the substantially solid surface of the core has a minimal number of holes through which a partial vacuum can be applied. While not wishing to be limited to any principle of operation, it appears that the fabric overlying the substantially solid surface helps to distribute the partial vacuum applied through the holes laterally and relatively uniformly along the surface of the mold. As described herein, a "minimal number of holes" means holes sufficient in number to cooperate with the fabric in producing a molded article with a relatively uniform wall thickness and less that the number of holes that results in the retention of excess water in the mold, thereby, interfering with the formation of a thin-walled, molded article. The number of holes that may be appropriate for a particular mold depends on the shape of the mold, the nature of the overlying fabric, the nature of the pulp and the desired properties of the molded article to be formed.

Because the molds of the present invention have a substantially solid surface covered by fabric, a minimal amount of water, if any, remains in contact with the fabric after the water is suctioned into the mold. In contrast, the prior art molds retain water in the void area inside the wire mesh screen; this water can "fall back" into the molded pulp article after the vacuum is removed, thereby rupturing or otherwise destroying the integrity of the wet molded pulp article. In the present invention, a core having substantially solid surfaces occupies the interior space behind the fabric covering on which the pulp is deposited and prevents water from being retained inside that space and in contact with the fabric. As a result, the mold does not contain excess water, a significant factor in the ability to prepare a thin-walled pulp article. Obviously, the core could have additional holes above the minimal amount. However, use of additional holes will result in lower air flow velocities which prevent proper formation of a molded pulp article on the fabric.

When a thin layer of cellulose pulp in the appropriate shape has been formed on the fabric the mold is pulled out of the pulp solution. With the mesh screen molds of the prior art it would be impossible to reliably extricate a wet, thin layer of cellulose from the many interstices of the mold. In the present invention, the thin layer of cellulose pulp is removed from the mold by terminating the vacuum and separating the fabric from the solid mold surface sufficiently to release the molded article from the fabric.

Molded pulp articles having an essentially uniform thickness can be prepared with molds embodying the present invention, notwithstanding that the mold core has a minimum number of apertures, or holes for application of the suction. The Lycra fabric overlying the core acts to distribute the vacuum uniformly over the surface area of the mold. The molds of the present invention are thus a substantial, surprising improvement on the prior art, and do not have the deficiencies of prior art molds.

FIG. 16 depicts one way in which separation of the molded article is accomplished. The stripper plates are moved downward thereby separating the fabric from the solid mold surface, except at the apex of the mold where they remain attached. Although not depicted in this figure, the molded pulp article is separated from the fabric and falls a short distance down below and away from the stripper plates. Normally, the entire mold and mounting plates have been moved, i.e., by moving the platen on which it is affixed, to a place apart from the pulp bath, where the molded pulp article can be collected. Preferably, this occurs by lateral movement that minimizes the height between the mold and the receiving surface upon release of the molded pulp article from the mold.

It should also be understood that the molds of the present invention can be employed singly or can be mounted side-by-side in rows and columns on rotating drums or on flat plates to improve efficiency in producing multiple thin-walled articles. Where flat plates are used, the plates can be lifted from the pulp slurry and moved laterally to a position where the article is removed from the mold, thereby minimizing the vertical drop which the articles will be subjected to.

A further advantage of the present invention is that the molded pulp articles contain less water than thick walled articles produced with mesh screen molds. As a result, less energy is required in the form of heat to dry the pulp into finished products. Drying can be accomplished using conventional processes, such as forced air or convection ovens known in the art.

By means of the present invention, it is possible to prepare thin-walled molded articles of paper pulp. For example, packing chips can be prepared having wall thickness of up to 1/32" and an average or median wall thickness less than that amount.

It should be understood that numerous variations can be made to the present invention without detracting from the principles hereof. In particular, the solid mold can take other shapes and sizes than that depicted in FIGS. 2–5. The shape embodied in those figures has been designed to accomplish certain goals. Among other things the resulting chips are shaped so that they do not nest. The shape, particularly the corner buttresses prevent nesting and add strength to the thin-walled structure. Nevertheless, it is contemplated that molds of other shapes and sizes may be utilized within the spirit of the invention. For example, it is possible to use the methods of the present invention to form thin-walled packing chips having cylindrical or pyramid shapes which are open on one end and meet the qualities described in the example below.

The process of the present invention can be used to produce other articles of various shapes from paper pulp. It is particularly useful for forming thin-walled articles and in forming articles from recycled paper pulp.

The description and examples set forth herein are intended to illustrate representative embodiments of the invention. The claims which follow are not intended to be limited to the specific disclosed embodiments. The invention is susceptible to modification, variation and change without departing from the proper scope or fair meaning of the following claims.

We claim:

1. A method for forming a biodegradable, thin-walled article comprising:

forming an aqueous cellulose pulp;

contacting the pulp with a mold comprising
   a core having a substantially solid surface having substantially the shape of the article to be formed, having a number of holes on the surface through which air may be evacuated, and channels connecting each of the holes to a vacuum source for the evacuation of air, and
   an air permeable, stretchable fabric material covering the exterior of the solid surface of the mold;

applying a vacuum through the holes of the surface of the core, thereby causing cellulose from the pulp to be deposited on the fabric in a thin layer having the shape of the article;

removing the mold from the pulp; and separating the fabric sufficiently away from the solid surface of the mold to cause the thin layer of cellulose to separate therefrom.

2. The method of claim 1 in which the biodegradable, thin-walled article is loose fill packing material.

3. The method of claim 2 in which the aqueous cellulose pulp comprises recycled paper.

4. The method of claim 2 in which the aqueous cellulose pulp comprises newsprint.

5. The method of claim 4 in which the pulp of aqueous cellulose also comprises starch in an amount effective to minimize dust associated with the handling of the biodegradable, thin-walled article and to increase the strength of the article.

6. The method of claim 2 in which the air permeable, stretchable fabric is a material selected from the group consisting of spandex and nylon/spandex blends.

7. The method of claim 2 in which the air permeable, stretchable fabric is spandex.

8. The method of claim 2 in which the air permeable stretchable fabric is a material blend of approximately 67 percent nylon and approximately 33 percent spandex with a weight of approximately 3.3 ounces per square yard.

9. The method of claim 2 comprising the further step of drying the thin layer of cellulose removed from the mold.

10. A method for forming a biodegradable thin-walled packing chip comprising:

forming an aqueous cellulose pulp comprising recycled paper;

contacting the pulp with a mold comprising
- a core having a substantially solid surface having substantially the shape of the article to be formed, having a number of holes on the surface through which air may be evacuated, and channels connecting each of the holes to a vacuum source for the evacuation of air, and
- an air permeable, stretchable fabric material covering the exterior of the solid surface of the mold;

applying a vacuum to said mold sufficient to cause cellulose from the pulp to be deposited on the fabric in a thin layer having the general shape of the packing chip:

removing the mold from the pulp;

separating the fabric sufficiently away from the solid surface of the mold to cause the thin layer of cellulose to separate therefrom; and drying the thin layer of cellulose to form the packing chip.

11. The method of claim 10 wherein the recycled paper comprises newsprint.

12. The method of claim 11 in which the pulp of aqueous cellulose also comprises starch in an amount effective to minimize dust associated with the handling of the biodegradable, thin-walled article and to increase the strength of the article.

13. The method of claim 11 in which the air permeable, stretchable fabric is a material selected from the group consisting of spandex and nylon/spandex blends.

14. The method of claim 13 in which the core further comprises a central body having a square cross-section, one end of the body being open and the other end comprising four sloped sides arranged in a pyramid shape.

15. The method of claim 11 in which the air permeable, stretchable fabric is spandex.

16. The method of claim 15 in which the core further comprises a central body having a square cross-section, one end of the body being open and the other end comprising four sloped sides arranged in a pyramid shape.

17. The method of claim 11 in which the air permeable stretchable fabric is a material blend of approximately 67 percent nylon and approximately 33 percent spandex with a weight of approximately 3.3 ounces per square yard.

18. The method of claim 17 in which the core further comprises a central body having a square cross-section, one end of the body being open and the other end comprising four sloped sides arranged in a pyramid shape.

19. The method of claim 11 in which the core further comprises a central body having a square cross-section, one end of the body being open and the other end comprising four sloped sides arranged in a pyramid shape.

* * * * *